Figure 1:
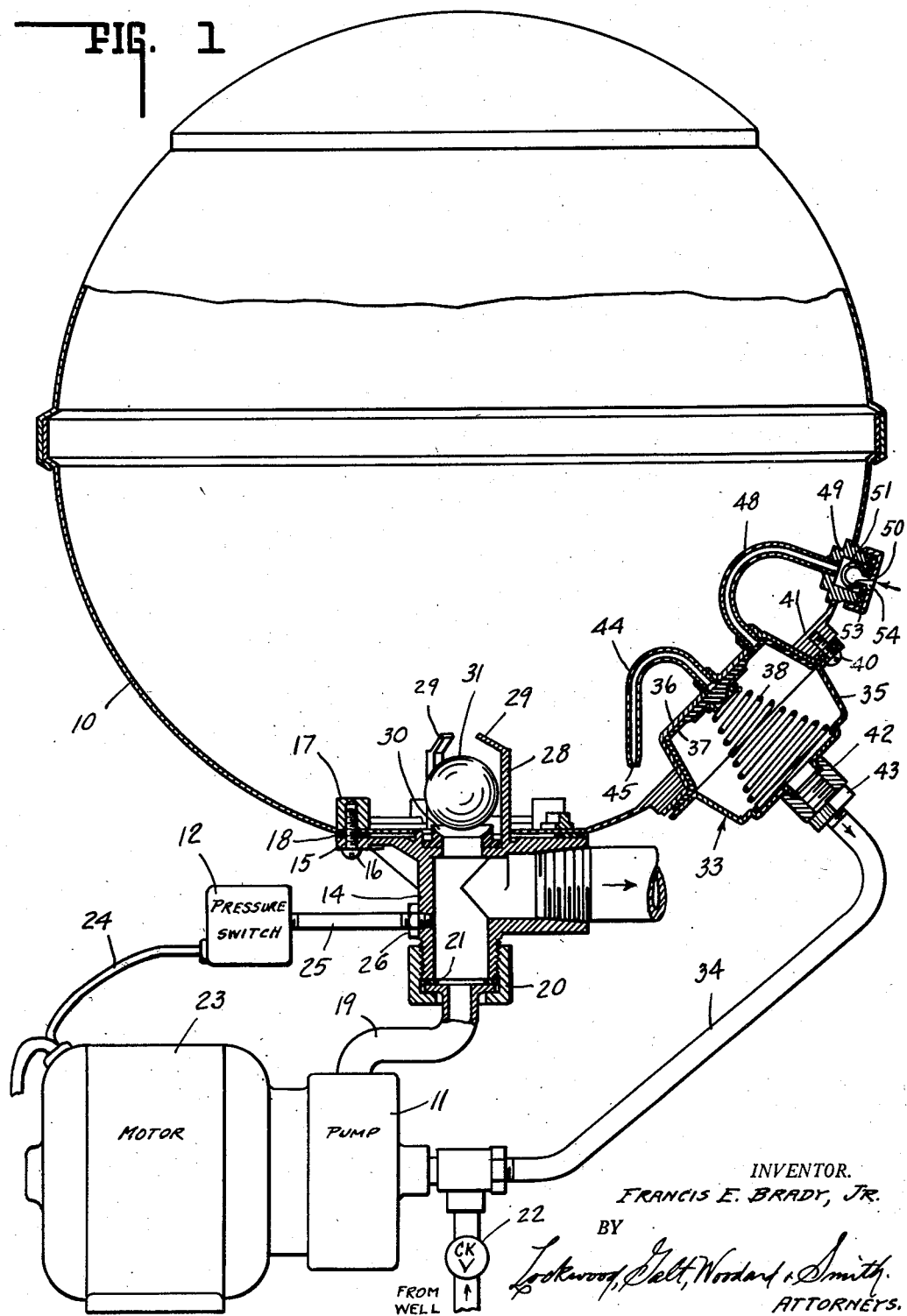

June 7, 1955  F. E. BRADY, JR  2,709,964
DIFFERENTIAL ACCUMULATOR FOR WATER SYSTEMS
Filed Oct. 14, 1952  2 Sheets-Sheet 1

INVENTOR.
FRANCIS E. BRADY, JR.
BY
ATTORNEYS.

June 7, 1955      F. E. BRADY, JR      2,709,964
DIFFERENTIAL ACCUMULATOR FOR WATER SYSTEMS
Filed Oct. 14, 1952      2 Sheets-Sheet 2
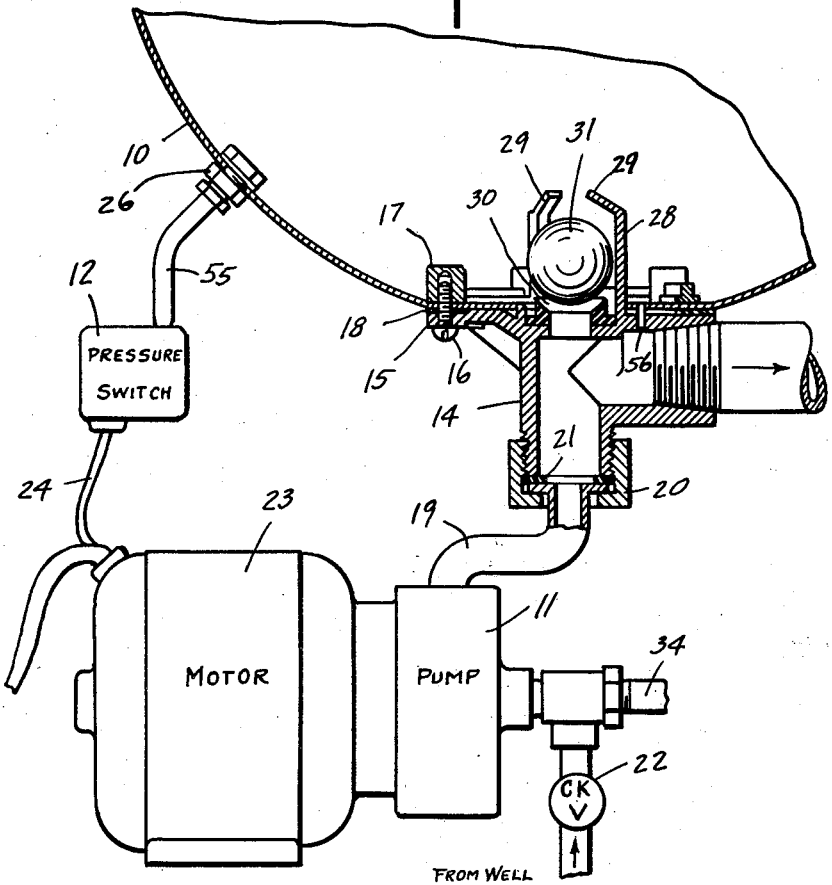
INVENTOR.
FRANCIS E. BRADY, JR.
BY
Lockwood, Galt, Woodard & Smith
ATTORNEYS.

United States Patent Office 2,709,964
Patented June 7, 1955

2,709,964
DIFFERENTIAL ACCUMULATOR FOR WATER SYSTEMS

Francis E. Brady, Jr., Muncie, Ind.

Application October 14, 1952, Serial No. 314,686

6 Claims. (Cl. 103—6)

This invention relates generally to domestic water supply systems and more particularly to differential accumulator apparatus for controlling the operation of such systems.

Conventional domestic water supply systems comprise a pressure storage tank, a pump, and a pressure operated switch for starting the pump when water pressure in the tank reaches a minimum of approximately 20 pounds and for stopping the pump at the maximum water pressure of approximately 40 pounds. During the initial tank filling cycle of such systems, water is pumped into the tank increasing the pressure therein from atmospheric pressure more or less to approximately 40 pounds, while subsequent cycles of operation vary the water pressure from a minimum of 20 pounds to a maximum of 40 pounds, except when water is being used faster than pump will deliver then pressure would drop below 20 pounds.

Since pressure is created within the tank simply by introducing water and trapping air therein, there is a residual or non-useable volume of water within the tank which is approximately equal in volume to 60% of the capacity of the tank. The useable volume of water which may be drawn from the tank as the pressure varies from a 40 pound maximum to a 20 pound minimum amounts to less than one fifth of the total volume of the tank. Thus, for example, to supply ten gallons of water with pressure variation between 40 pounds and 20 pounds, a tank of over fifty gallons total capacity is required, of which 30 gallons is usable only on the few occasions when pressure falls below 20 pounds. Obviously there is excessive tank expense in the conventional domestic water supply systems.

The useful capacity of a domestic water supply system may be increased to a substantial degree by reducing the residual volume of water to a bare minimum, for example only enough to cover the tank outlet port, thereby to prevent escape of air. Conversely, the total tank capacity of a conventional domestic water supply system may be reduced and the useful capacity maintained constant by reducing the residual volume of water. This result can be accomplished in either of two ways. The tank may be filled initially with air to a pressure of 20 pounds, after which water may be pumped into the tank until the usual maximum of 40 pounds is reached. Alternatively, water may be pumped into the tank in the usual way where the air pressure is equal to atmospheric pressure, and pumping may be continued until the maximum pressure of 40 pounds is reached. After this initial pumping cycle relatively small quantities of air may be added during each pumping cycle to attain a condition where sufficient air has been added that the tank is almost empty of water at 20 pounds pressure. A conventional water system may be operated in this fashion except that no apparatus has been provided for preventing introduction of excessive amounts of air whereby water is completely exhausted from the tank at 20 pounds pressure and air may escape into the water distribution pipes. Thus even though a conventional water supply system includes an air pump for replenishing air within the pressure tank, there is still no automatically operable means for preventing complete evacuation of water from the pressure tank.

Accordingly, it is the principal object of this invention to provide, in a domestic water supply system, means for maintaining a water seal at the outlet port of the pressure tank of said system.

Another object of this invention is to provide, in a domestic water supply system, an outlet valve automatically operable at a predetermined minimum water level to seal the outlet port of the tank.

Still another object of this invention is to provide in a domestic water supply system apparatus for providing automatic maintenance of a constant ratio of maximum air volume to minimum water volume within the pressure tank so that the residual quantity of water in the tank may be reduced to the minimum required for sealing the outlet port of the tank.

In accordance with this invention there is provided a differential accumulator for domestic water supply systems comprising a closed pressure tank, a pump connected to said tank, means for maintaining predetermined minimum air pressure in said tank and an automatically operable valve in the outlet port of said tank for closing said port when water in the tank reaches a predetermined minimum level.

The full nature of the invention will be understood from the accompanying drawings and the following description and claims:

Fig. 1 of the drawing is a side elevation view, partially in cross section, illustrating the differential accumulator provided in accordance with this invention.

Fig. 2 is a partial cross sectional view of the invention illustrated in Fig. 1 showing an alternative arrangement of the pressure switch.

This invention comprises a domestic water supply system having a pressure tank 10, a motor driven pump 11 and an automatically operable pressure switch 12 adapted to close a motor circuit for operating pump 11 when the pressure in the tank 10 reaches a minimum value of approximately 20 pounds and for opening the motor circuit when the pressure within the tank 10 reaches a maximum value of approximately 40 pounds. Pump 11 and switch 12 may be connected to a tank 10 by means of a flanged fitting having a body portion 14 and a flange portion 15, which may be mounted on tank 10 by means of a number of screws 16 threadedly engaging an internal collar 17. A washer or sealing gasket 18 may be provided for preventing leakage of water. A pipe connection 19 from pump 11 to the body portion 14 may include a flanged collar 20 threaded to body portion 14 and clamping the flanged end of pipe 19 into firm engagement with a washer 21 thereby to provide a sealed connection. This structure is disclosed by way of example only and may be modified in many ways in accordance with conventional practice. Pressure switch 12 may be connected to motor 23 by wires 24 and to the body portion 14 by means of a pipe 25 threaded into body portion 14 as illustrated and locked with respect thereto by means of a lock nut 26.

Body portion 14 of the flanged fitting includes a plurality of, for example three, vertical guide members 28 or ball retaining members having overhanging extensions 29. A resilient valve seat 30 of rubber, for example, may be mounted coaxially with the guides 28 within a recessed portion of the body 14, as illustrated in the drawings. Cooperating with valve seat 30 is a ball check 31 which may comprise a hollow plastic ball similar in nature to a "pingpong ball." Thus the ball 31 is buoyant and tends to float upwardly into contact with the overhanging hooks 29 on guide members 28 when the tank is filled with water to the desired pressure and during evacuation of water. The ball 31 must be designed, in accordance with this invention, to have a very critical buoyancy of approximately 55%, meansing that the ball is sufficiently buoyant that 55% of its weight is above water when the ball floats. This characteristic of ball 31 permits it to drop into sealing relation with seat 30 when the water is evacuated to a predetermined level as will be described subsequently. This figure of 55% applies in particular to a ball having an outer diameter of 1¼ inches. This specific characteristic of ball check 31 is disclosed as a typical example because when the outer diameter of the ball is changed, then it may be necessary to alter the buoyancy of the ball in order to obtain the desired results. The reasons for the critical buoyancy of ball check 31 will become more apparent in connection with the subsequent description of the operation of the invention.

For maintaining a constant supply of air and a certain minimum water level within tank 10 there is provided an automatically operating air volume control apparatus 33 connected to the inlet pipe 22 of pump 11 by means of the pipe 34. The air volume control apparatus 33 consists of an outer shell 35 projecting outwardly of tank 10 and an inner shell 36 projecting within tank 10. Within the shells 35 and 36 there is provided a flexible diaphragm 37 biased into the position illustrated in the drawings by means of a spring 38, which is disposed between outer casing 35 and the surface of diaphragm 37 as illustrated in the drawings. The shells 35 and 36, together with diaphragm 37 are clamped in sealing relation to tank 10 by means of a plurality of screws 40 threaded into a thickened circular collar 41 formed integrally with tank 10. The space between diaphragm 37 and outer shell 35 may be connected to pipe 34 in any conventional manner such for example as by the internally threaded connector 42 and a lock nut 43.

The inner side of diaphragm 37 is exposed to the pressure within tank 10 by means of a tube 44 having an extremely small orifice 45 at its outer end, and it should be specifically noted that tube 44 is bent to locate orifice 45 at the predetermined minimum water level which it is desired to maintain within the tank 10, this level being sufficiently above seat 30 to prevent escape of air from tank 10. Tube 44 may be fixed and sealed with respect to the inner shell 36 in any conventional fashion. The inner surface of diaphragm 37 is also exposed to the atmosphere by means of a tube 48 which connects shell 36 with a fitting 49 located in the shell of tank 10. Fitting 49 includes a small, rubber, oneway valve 50 commonly called a "snifter" valve, which may be formed of a flexible material such as rubber and be provided with an opening in the form of a slit 51 whereby pressure within tube 48 will close valve 50 and vacuum within tube 48 will open valve 50. This valve may be sealed to fitting 49 by means of a cap 53 having an aperture 54 for exposing the valve 50 to atmospheric pressure.

In operation, the initial operating cycle may be started with the interior of tank 10 at atmospheric pressure or at a predetermined minimum pressure of approximately 20 pounds. Assuming that the pump is started when the tank is at atmospheric pressure, water will be pumped into the tank with ball check valve 39 forced upwardly to its uppermost position, and flow will continue until the maximum pressure of approximately 40 pounds operates pressure switch 12 to deenergize motor 23. The water level at maximum pressure will be such that approximately 60% of the volume of the tank is filled with water. As water is withdrawn from the tank, the water level, of course, will recede, but the lower end of tube 44 will be under water even when the pressure in the tank reaches the minimum level of 20 pounds.

For example, if it is assumed that the tank 10 has a capacity of 10 gallons, it can be shown that withdrawal of approximately 1.55 gallons will lower the pressure within tank 10 to twenty pounds. We can assume that the volume of air within tank 10 will change in accordance with the equation $$\frac{P2}{P1} = \frac{V1}{V2}$$

where P1 is the pressure when the tank is empty, P2 is the pressure when the tank is partially filled, V1 is the volume of the tank when empty and V2 is the volume of air within the tank at pressure P2. Then it may be assumed that V1 minus V2 is the volume of water within the tank at pressure P2. Assuming that normal water system operation is from zero pounds gauge to 40 pounds gauge, where the pressure switch stops the pump, and that water is drawn to a minimum pressure of 20 pounds gauge when the pump starts, and further assuming that $V1 = 10$ gallons, we have the equation $$\frac{20+14.7}{0+14.7} = \frac{10}{V2}$$

Solving this equation, V2 at 20 pounds gauge equals 4.23 gallons. This is the volume of air above water at 20 pounds gauge pressure within the tank. Solving the same equation for the volume of air above the water at 40 pounds gauge pressure $$\frac{40+14.7}{0+14.7} = \frac{10}{V2}$$

V2 at 40# gauge pressure = 2.68 gallons. Thus subtracting V2 at 20 pounds gauge pressure from V2 at 40 pounds gauge pressure, it appears that 1.6 gallons of water can be drawn from the tank. Therefore tube 44 will still be under water at 20 pounds gauge pressure.

When the pump 11 starts for a second cycle, it creates vacuum within pipe 34 since this pipe is connected to the intake 22 of the pump. Diaphragm 37 will be moved against the pressure of spring 38 creating vacuum within shell 36 of the air volume control 33. The orifice 45 in tube 44 is of such size that water will not pass into tube 44 in any substantial quantity, but air will be drawn through snifter valve 50 and through tube 48 into the space between diaphragm 37 and shell 36 and will remain therein until pump 11 has again raised the pressure within the tank to 40 pounds gauge. At this point, pump 11 will be stopped by switch 12 and vacuum will be withdrawn from tube 34 so that spring 38 may move the diaphragm 37 back to its original position expelling air through tube 44 into tank 10. During this expelling period the snifter valve 50 will have closed preventing escape of air into the atmosphere.

During successive cycles of operation more and more air will be introduced into the tank 10 by the air volume control 33 until eventually the water level at 20 pounds gauge pressure will have receded to the level of the orifice 45 in tube 44. At this point during a pumping cycle diaphragm 37 will not function to draw air through snifter valve 50 due to the fact that air can enter orifice 45 and prevent creation of a vacuum between shell 36 and diaphragm 37. On the contrary, there will be 20 pounds pressure in this space which will hold snifter valve 50 closed. Since air escaped from tank 10 through orifice 45 into the air volume control 33, no additional air will be injected into the tank during the pumping cycle. At such time as the water within the tank 10 absorbs air sufficient to permit the water level to rise above orifice 45 at 20 pounds gauge pressure, the air volume control will serve to replenish the air within the tank in the same fashion as described before.

From the foregoing it will be apparent that the normal operation of the water system disclosed herein causes the water level within tank 10 to be substantially constant within very small limits with respect to the orifice 45 in tube 44. Thus, when water has been withdrawn from tank 10 to such a point that the gauge pressure reaches 20 pounds, provisions must be made to prevent complete evacuation of water from the tank because otherwise the air in the tank would escape into the water distribution pipes on the occasion when pressure drops below 20 pounds. Therefore, the ball check valve 31 is provided for sealing off the flow of water just as the water level recedes to the level of the orifice 45. As described before, the buoyancy of the ball 31 is rather critical as this ball must be sufficiently buoyant to prevent seating of the ball during normal water flow. If the ball were not sufficiently buoyant, the flow of water downwardly through the valve would draw the ball into the seat 30, thereby preventing flow of water before minimum pressure was reached. On the other hand, ball 31 must seat when the water level reaches the level of orifice 45, thereby to prevent complete exhaustion of water from the tank. At this level, ball 31 will have moved downwardly closer to seat 30 and the flow of water will create sufficient suction with respect to ball 31 to draw it onto seat 30. In the case of a ball having an outside diameter of 1¼ inches, it was found that approximately 55% buoyancy is required. If the size of the ball is increased or decreased, then the buoyancy must be changed accordingly to obtain the necessary balance of buoyancy and weight to insure that the ball will not seat prematurely or too late to prevent complete evacuation of water.

Operation of the system with 20 pounds gauge pressure when the water level is at the level of orifice 45 provides the same usable volume of water at lower maximum tank pressure. For example, using the same equation as was used hereinbefore and solving for the pressure P2 when 1.6 usable gallons of water are in the tank 10, we find that $$\frac{P2}{34.7} = \frac{10}{10 - 1.6}$$

$$P2 = 26.3\# \text{ gauge pressure}$$

Thus, to obtain 1.6 useful gallons of water it is necessary to vary the pressure only between 20 and 26.3 pounds gauge. Converesly, if pressure is still varied from a minimum of 20 pounds gauge to 40 pounds gauge, approximately 3.65 gallons of water may be withdrawn from the tank, which indicates approximately double the useful capacity of the tank.

From the foregoing description it will be apparent that this invention permits either the use of a smaller pressure tank, having a volume of 10 gallons, for example, in a domestic water supply system or increased useful water capacity in domestic water supply systems having tanks of 25 to 80 gallon capacity.

While the invention has been disclosed as including a pressure responsive switch 12 connected to the body portion 14 of the flanged fitting, it is also conventional to connect the pressure responsive switch to the tank 10 by a pipe 55 as shown in Fig. 2, whereby it responds only to pressure existing within the tank. With this arrangement it is possible that the ball check 31 may seat on the valve seat 30 before the pressure within the tank 10 actually is lowered to 20 pounds. This can happen once in every thousand cycles of operation, for example. When this condition does occur, it is impossible to draw water from the tank, and the pressure switch is not actuated to start the pump 11 whereby the system is in effect blocked. To take care of such a condition a bleeder port 56 may be provided in the flanged fitting so that after the ball check 31 seats on the valve seat 30, water may drain very slowly from tank 10 until the minimum pressure of 20 pounds is reached, at which time pressure switch 12 energizes the motor and pump 11 forces water into tank 10 unseating the ball check 31. It will be understood that the bleeder port 56 should be of extremely small diameter permitting only a very limited flow from tank 10. It will also be understood that flow through bleeder port 56 may be started when a spigot in the water supply line is opened for drawing water, assuming of course that ball check 31 is closed. It will also be understood that because of the small diameter of bleeder port 56, water will not be completely exhausted from tank 10 before switch 12 energizes the motor and pump 11 for replenishing the supply of water in the tank.

The invention claimed is:

1. A domestic water supply system comprising a closed pressure tank having air entrapped therein; a pump connected to said tank; an outlet connected in the bottom of said tank, means for maintaining predetermined minimum air pressure in said tank effective to inject air into said tank when the water level at said minimum pressure exceeds a predetermined level; and a valve for said outlet to control the flow of water therethrough comprising a buoyant ball, a seat in said outlet for receiving said ball and a cage for holding said ball at a certain maximum distance above said seat, said ball having such a buoyancy that it is seated when water in said tank reaches said predetermined level.

2. A domestic water supply system comprising a closed pressure tank having air entrapped therein; a pump connected to said tank; an outlet connected in the bottom of said tank, means for maintaining predetermined minimum air pressure in said tank effective to inject air into said tank when the water level at said minimum pressure exceeds a predetermined level; and a valve for said outlet to control the flow of water therethrough comprising a buoyant check valve, and a seat in said outlet for receiving said check valve, said check valve having such a buoyancy that it is seated when water in said tank reaches said predetermined level.

3. A domestic water supply system comprising a closed pressure tank having air entrapped therein; a pump connected to said tank; an outlet connected in the bottom of said tank means for maintaining predetermined minimum air pressure in said tank effective to inject air into said tank when the water level at said minimum pressure exceeds a predetermined level; and a buoyant valve in said outlet having such a buoyancy that it is closed when water in said tank reaches a predetermined minimum level.

4. A water supply system comprising a closed pressure tank, a pump connected to said tank, an outlet connected in the bottom of said tank, air injection means including means responsive at a predetermined water level in said tank for injecting air into the said tank to replenish water absorbed air, and a check valve in the outlet of said tank effective to close said outlet when the water level in said tank falls below said predetermined level.

5. A water supply system comprising a closed pressure tank, a motor operated pump connected to said tank, an outlet connected in the bottom of said tank, a pressure switch connected to said tank and motor for initiating pump action when the tank pressure reaches a predetermined minimum and stopping pump action when said pressure reaches a predetermined maximum, check valve means in the outlet of said tank operative to close said outlet when the water reaches a predetermined level with respect to said outlet, and air injection means effective to maintain said minimum tank pressure at said predetermined water level.

6. A water supply system comprising a closed pressure tank, a motor operated pump connected to said tank, a pressure switch connected to said tank and motor for initiating pump action when the tank pressure reaches a predetermined minimum and stopping pump action when said pressure reaches a predetermined maximum, an outlet in the bottom of said tank, a check valve in said outlet operative to close said outlet when the water level reaches a minimum required for providing an air seal of said outlet, and an air injection means including a vacuum pump actuated by said motor operated pump having a check valve controlled opening to atmosphere and a water resistant air admitting opening at said minimum water level for maintaining air at said minimum pressure at said minimum water level.

References Cited in the file of this patent

UNITED STATES PATENTS

| | | |
|---|---|---|
| 1,767,541 | McCarthy | June 24, 1930 |
| 1,823,459 | McCarthy | Sept. 15, 1931 |
| 2,183,421 | Brady | Dec. 12, 1939 |
| 2,303,627 | Fuller | Dec. 1, 1942 |
| 2,621,597 | Armstrong et al. | Dec. 16, 1952 |